Aug. 9, 1955 G. C. ELLERBECK 2,714,989
CALCULATING MACHINE
Filed May 11, 1951 8 Sheets-Sheet 1

FIG_1

GRANT C. ELLERBECK
INVENTOR
BY
ATTORNEY

Aug. 9, 1955

G. C. ELLERBECK

2,714,989

CALCULATING MACHINE

Filed May 11, 1951

GRANT C. ELLERBECK
INVENTOR.

BY *Robyn Hilcox*

ATTORNEY

United States Patent Office 2,714,989
Patented Aug. 9, 1955

2,714,989

CALCULATING MACHINE

Grant C. Ellerbeck, San Leandro, Calif., assignor to Friden Calculating Machine Co., Inc., a corporation of California Application May 11, 1951, Serial No. 225,733

27 Claims. (Cl. 235—73)

This invention relates to a calculating machine, and more particularly to a mechanism selectively operable to transfer values from the accumulator of a calculating machine of the type disclosed in the patent to Friden No. 2,229,889 to a storage device or duplex register in which grand totals can be accumulated, or which operates as a constant factor device for the keyboard of such a machine whereby a value may be stored therein and taken out as desired for insertion onto the keyboard.

One of the primary objects of my invention is to provide a "duplex" calculating machine in which values can be accumulated in an accumulator, or product register, of known type, and the values accumulated therein may be transferred, from time to time as desired, to a storage register, or grand accumulator.

Another one of the primary objects of my invention is to provide a "back transfer" calculating machine in which values accumulated in an accumulator, or product register, can be transferred therefrom into the selection mechanism; whereby such a value can be used as the keyboard value in a subsequent operation.

Another important object of this invention is to provide a value storage mechanism associated with the keyboard of a calculating machine which may be utilized to store a "constant" factor selectively set therein, which constant factor can be used as and when desired, or disregarded without changing the setting of the storage device.

Another important aspect of the present invention is to provide a machine having a constant storage device associated with the keyboard thereof and into which values may be set by transference from the accumulator, or product register.

Still a further aspect of my invention is to provide a mechanism by means of which a dividend value may be retained in storage dials so that at the end of the division operation the original dividend, the quotient, the divisor, and the remainder are shown on the machine.

Still another object of my invention is to provide a duplex register machine in which values may be transferred from either register to the other, additively or subtractively, at the will of the operator.

Still a further object of the present invention is to provide a mechanism by means of which values accumulated in either of the registers of a duplex register calculating machine may be transferred to a storing mechanism and there held at the will of the operator until desired, and thereupon inserted into the keyboard of the calculating machine.

Another general object of the present invention is to provide a single, and relatively simple, mechanism which can be used selectively to: (1) convert a conventional single accumulator calculating machine into a duplex register calculator in which values in either register can be transferred to the other as desired; (2) transfer the value in either register into the keyboard or a storage device, selectively; and (3) provide a constant mechanism by means of which any desired value may be inserted into the keyboard, or stored for future use, at the will of the operator.

These and other objects of the present invention will become apparent from a consideration of the following description of the preferred embodiment shown in the drawings in which:

Fig. 8 is a left side view of the rear portion of the left side control plate showing a portion of the control mechanisms mounted thereon and with a portion of such mechanisms removed for simplification.

GENERAL ARRANGEMENT

My invention is disclosed as embodied in a calculating machine of the type disclosed in the patent to Friden No. 2,229,889 above referred to. Only so much of that machine as is pertinent to the present mechanism and its operation is disclosed herein, while all other features (such as the operations counter, the carriage shifting mechanism, the division control mechanism, and the multiplier unit) are omitted for the sake of clarity and brevity. While the invention is shown as disclosed in its preferred form in connection with the machine of the patent above referred to, it will be obvious to those skilled in the art that the invention can be adapted to use in other types of calculating machines.

Figure 1:
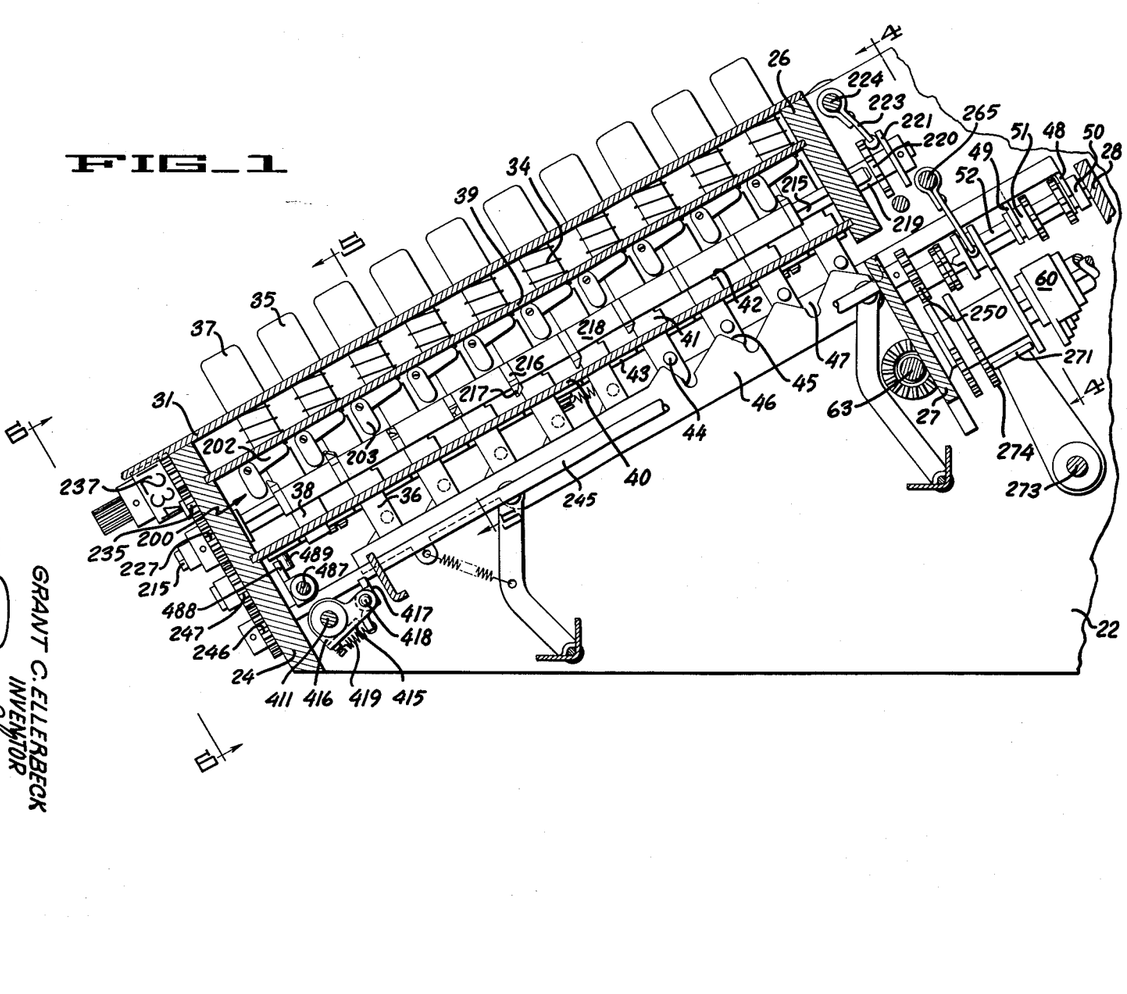
Fig. 1 is a longitudinal cross-sectional view through the keyboard of a machine of the type disclosed in the above mentioned patent, with my invention included therein.
Figure 6:
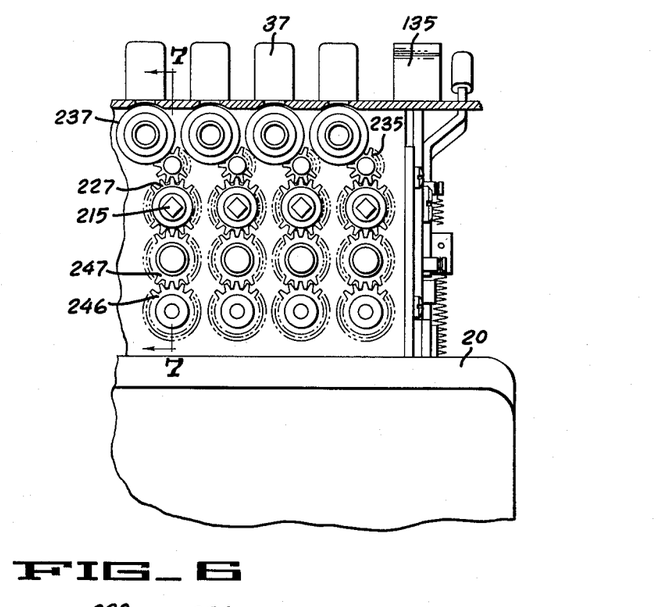
Fig. 6 is a partial front view of the machine of my invention, with the cover removed.

*Frame.*—A machine of this type is conventionally mounted upon a base plate 20 (Fig. 6) upon which is mounted a right side frame plate 21 (Fig. 3) and a left frame plate 22 (Figs. 1, 8, 9, and 10). The side plates 21 and 22 are held in rigid spaced relationship by suitable cross members, such as crossbar 24 at the front of the machine (Fig. 1), brace plate 25 at the rear of the machine (Fig. 2), and various intermediate cross members such as 26, 27, 28, 29 and 30. These cross members also serve as bearing plates for various parts of the mechanism, as is shown particularly in these two figures just mentioned. The mechanism will be enclosed by a suitable cover plate 31 such as shown in Figs. 1 and 6.

Figure 2:
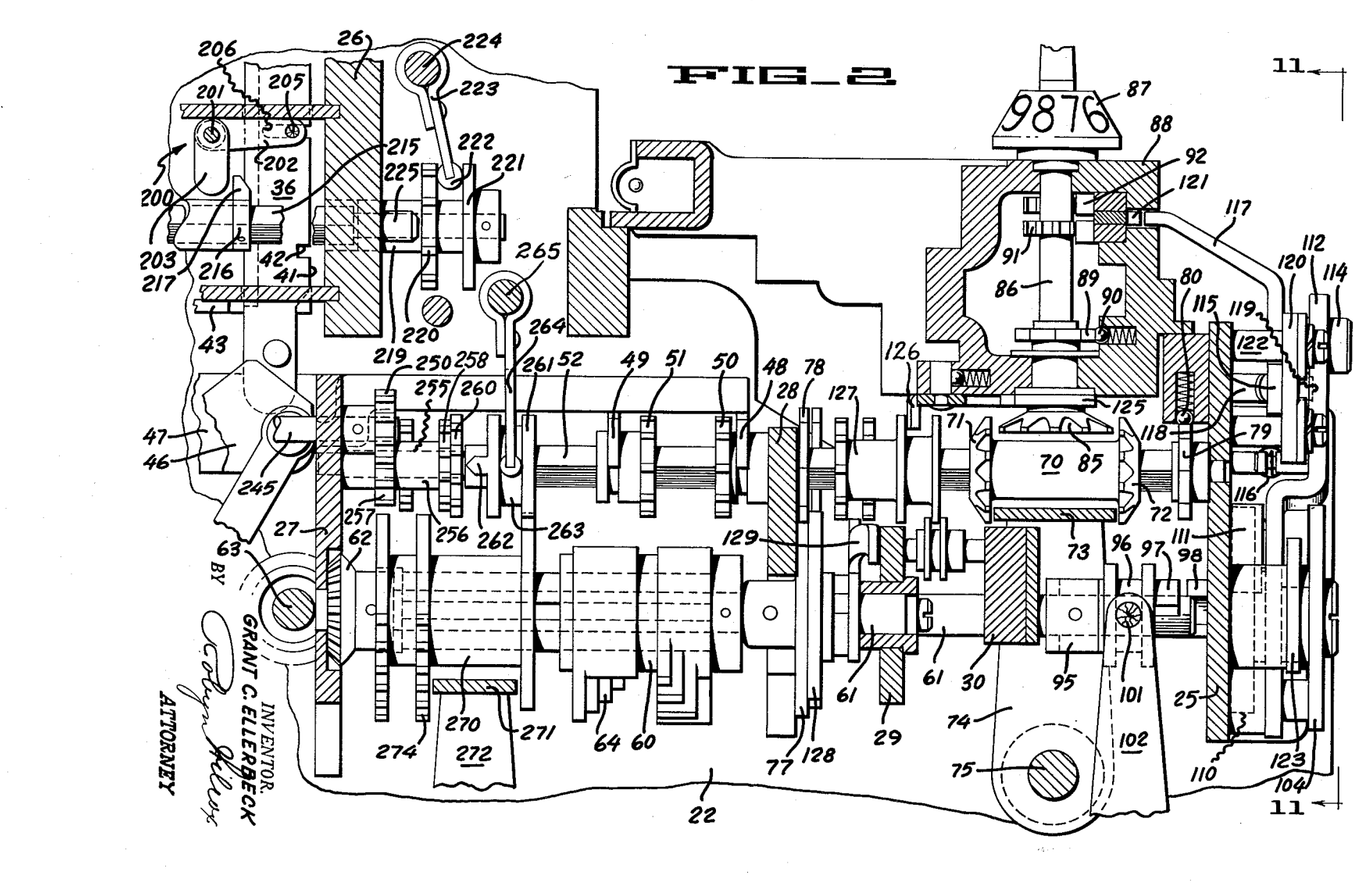
Fig. 2 is an enlarged detail drawing, also on a longitudinal plane through the machine, showing the actuator and register mechanism of the machine in Fig. 1.
Figure 3:
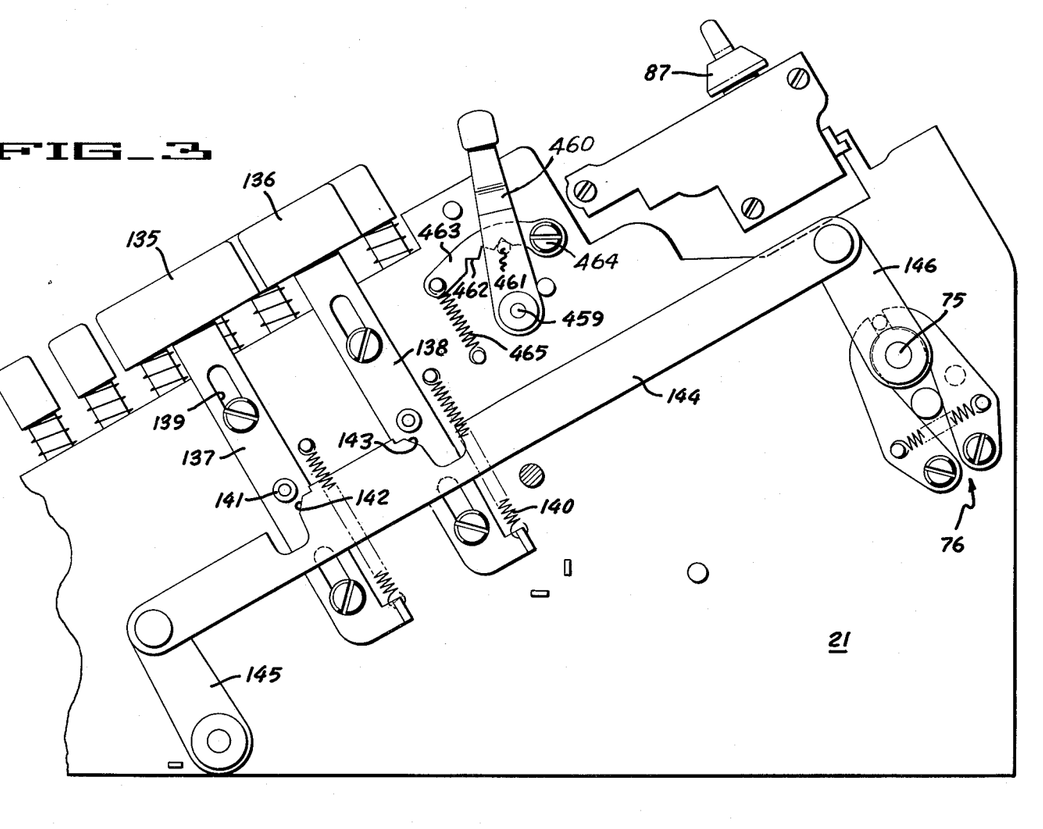
Fig. 3 is a right side view of a control plate of the machine of the type mentioned, showing the plus and minus control mechanism.

*Selection mechanism.*—A conventional selection mechanism is shown in Fig. 1. Such a selection mechanism is mounted in a keyboard assembly comprising the numeral keys 35 arranged in a plurality of orders, only one of which orders is shown in Fig. 1. The numeral keys 35 are mounted upon numeral key stems 36 which are mounted for sliding vertical movement in suitable slots in supporting plates 39 and 40, and are urged to their raised position by suitable springs 34. Associated with the numeral keys 35 is a zero key 37 in each order of the keyboard, which key is mounted on a suitable key stem 38. The numeral key stems 36 are provided with suitable camming projections 41 and latching slots 42 which cooperate with a latching slide 43 to latch a depressed key in its depressed position. The key stem 38 is similar to the key stems 36 insofar as the camming projection is concerned, but has no latching slot as the sole purpose of the zero key 37 is to release any key in that order which is latched in a depressed position—the key 37 acting only as an ordinal clear key. The numeral key stems 36 are provided with a stud 44 on the lower end thereof which is adapted to cooperate with the camming edges 45 of the ordinal selection slides 46 and 47. As is conventional in the machine referred to, the first slide 46 serves the 6 to 9 keys, inclusive, and the slide 47 serves the 1 to 5 keys, inclusive. The two slides 46 and 47 are provided with rearwardly extending extensions which terminate in a bent over yoke 48 and 49, respectively, engaging a suitable slot in the collar of selection gears 50 and 51 respectively. The cam faces 45 have slopes, varying from the vertical, representative of the value selected, so that depression of any value key 35 causes a longitudinal translation of the corresponding slide proportional to the value of the key depressed. This translation of the slide moves the selection gears 50 or 51 forwardly into the path of the mutilated actuator drum 60. The gears 50 and 51 are slidably mounted on a square shaft 52 which extends rearwardly to the rear plate 25, as shown in Fig. 2.

*Actuators.*—The mutilated actuator drums 60 are mounted on suitable shafts 61, which are driven by means of bevel gearing 62, from a unidirectional drive shaft 63. The drive shaft 63 is given a single rotation for each cycle of the machine so that the drums 60 are likewise given a single cycle of rotation in a constant direction. The drums 60 are provided with stepped teeth 64 whereby the gears 50 or 51 will be rotated a number of steps depending upon the longitudinal position of the gears, which in turn depends upon the setting of the numeral key 35. It is conventional in machines of this type that one actuator shaft 61 serve two orders of the machine (i. e., two square shafts 52), and I have shown my invention in such a machine modified by having only a single drum actuator 60 also serve two orders.

A gear spool 70 is slidably mounted adjacent the rear end of the square shaft 52. The spool 70 carries a gear at each end, a plus gear 71 being mounted on the front end of the spool 70 and a minus gear 72 being mounted on the other. The plus and minus gears 71 and 72 are adapted to engage an accumulator gear 85 mounted on the lower end of an accumulator shaft 86, upon movement of the spool 70 in either direction from its centralized disengaged position shown in Fig. 2. The spool 70 is moved by a conventional gate 73 mounted on arms 74 which are pinned to transverse shaft 75. The shaft 75 and spool 70 are held normally in the disengaged position by a suitable centralizer 76 (shown in Fig. 3). Thus the differential rotation of the square shaft 52 (produced by the differential translation of the gears 50 or 51 thereon) rotates the spool 70, and if the spool is translated either forwardly or rearwardly (to the left and right, respectively, in Fig. 2) it will engage accumulator gear 80 and rotate it, in one direction or the other, for a like amount. Overthrow is prevented in square shaft 52 by a suitable Geneva block 77 mounted on shaft 61 and associated Geneva wheel 78 mounted on the square shaft. The shaft 52 is held from rotational displacement until the beginning of digitation by a suitable star wheel 79 and spring ball detent 80 shown at the right end of the square shaft.

*Digitation control.*—The shaft 75 may be rocked in either an additive or subtractive dirrection (to the right and left respectively in Figs. 2 and 3) by suitable means. Manual control of this shaft can be had through the plus key 135 or the minus key 136 (Fig. 3) which are respectively mounted on the key stems 137 and 138 respectively. The key stems are suitably mounted for vertical sliding movement on the frame plate 21 by pin-and-slot connections 139, as shown. They are normally urged to their raised position by suitable springs 140. The key stems carry rollers 141 which are adapted to engage, upon depression of the respective key, one of the opposed cam edges 142 and 143 respectively carried by the link 144. The link is supported at its forward end on an arm 145 pivotally mounted on the frame plate, and at its rearward end on an arm 146 rigidly secured to the shaft 75. Thus depression of the plus key 135 rocks the shaft 75 rearwardly (clockwise in Fig. 3) while depression of the minus key 136 rocks the shaft 75 forwardly (counter-clockwise in this figure). The depression of the plus or minus keys is also operative to close the switch to a motor, not shown, and to cause engagement of the main drive clutch, not shown, as is explained in the patent above referred to.

Figure 9:
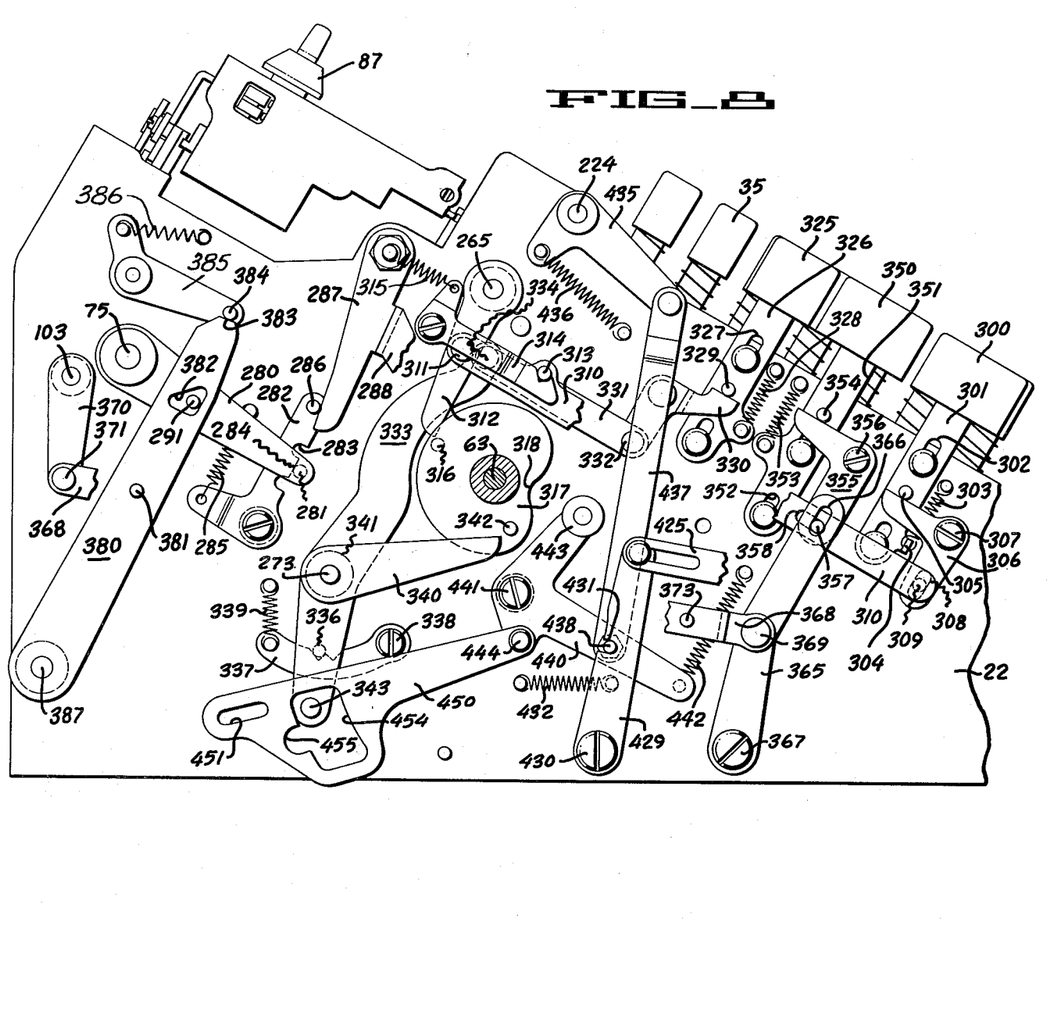
Fig. 9 is a view similar to Fig. 8 showing additional control mechanisms which are mounted on the outside of the left side frame plate.

*Digitation latch.*—It is customary in machines of this kind to provide a mechanism for latching the plus-minus spools in a digitating position during a digitation cycle. One such means is shown in Figs. 8 and 9. Mechanism here shown for purposes of illustration comprises an arm 280 rigidly secured to the setting shaft 75. The outer end of the arm carries a pin 281 which is adapted to be engaged by a latching member 282 pivoted on the frame plate 22 as shown. The latching arm 282 is provided with a pair of spaced notches 283 separated by a substantially straight edge, or land, 284. When the setting shaft 75 is in the neutral position (both the plus and the minus gears are disengaged from the accumulator gear 85), the pin 281 will lie on the straight edge 284. In this position the force of the spring centralizer 76 (Fig. 3) will hold the pin on the straight edge between the two notches. However, when the shaft 75 is rocked for either positive or negative digitation, the pin 281 will rock into engagement with one of the notches 283. Thereupon the arm 282 will rock clockwise under the urgency of its spring 285, thereby positively locking the control shaft 75 in the adjusted position. The latch 282 is released at the end of the digitation cycle by any suitable means. One such unlatching means is shown in Figs. 8 and 9 and comprises a branched lever 287 pivoted on the frame plate 22. One arm, or branch, of this lever lies against a pin 286 riveted on the end of the latching lever 282. The other branch, or arm, 288 extends forwardly in a plane adjacent a cam 290 mounted on the left end of the drive shaft 63 (Fig. 9). The cam 290 carries a pin 289 which engages the forward arm 288 of the branch lever, just before the end of the cycle. The rocking of the branch lever 287 rocks the latch 282 counter-clockwise thereby releasing the arm 280 and permitting the control shaft 75 to be returned to its centralized position by the centralizer above mentioned. The mechanism shown in Fig. 9 is in the normal, or full cycle, position, the shaft 63 (and consequently cam 290) rotating in a counter-clockwise direction during digitation.

*Accumulator.*—The accumulator register of the machine is preferably mounted in a carriage which is ordinarily shiftable in either direction. Preferably the carriage includes a hollow frame 88 in which is mounted the accumulator dial shafts 86. An accumulator gear 85 is affixed to the lower end of each of these shafts 86 and is adapted to cooperate with the plus and minus gears 71, 72. A dial 87 is carried at the upper end of the shaft. The dials are held in a centralized position by a suitable star wheel 89 and cooperating ball detent 90. The dials may be cleared when desired by the operator by means of conventional mutilated gears 91 mounted on the shafts 86 which cooperate with a longitudinally displaceable rack 92.

Figure 11:
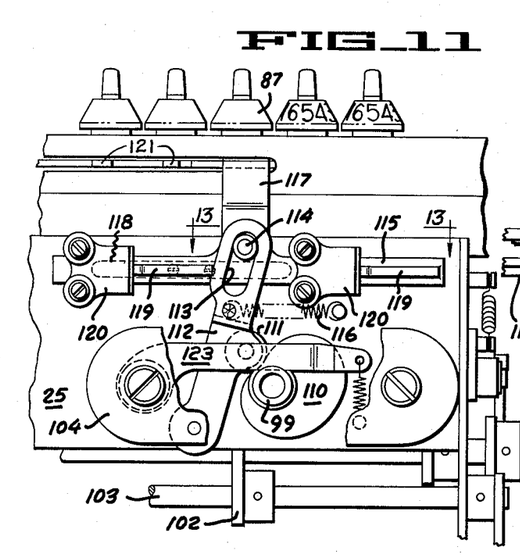
Fig. 11 is a rear view of a clearing mechanism suitable for the machine of my invention.

*Accumulator clearing.*—The rack 92 may be provided with manual means for operating the same, as is described in said patent above referred to. It is also desirable that the dials be cleared by power at the election of the operator, and a means therefore is shown in Figs. 2 and 11. Basically this clearing mechanism is similar to that shown in the patent to Friden No. 2,294,083, but as it is desired to operate in any carriage position certain modifications have been made. In a clearing mechanism of this kind the leftmost actuator shaft 61 is extended rearwardly through the bar 30, as shown in Fig. 2. On its rearward end is mounted a collar 95 which is pinned to the shaft 61, as shown. Associated with the collar 95 is a shiftable collar 96 which is provided with a tongue which slides in suitable grooves in the affixed collar 95. Thus the two collars rotate in unison, but the shiftable collar 96 is shiftable longitudinally of the shaft 61. The shiftable collar 96 carries clutch teeth 97 which are adapted to engage clutch teeth 98 on the sleeve 99 journalled between the plate 25 and a bracket 104. The shiftable collar 96 is moved longitudinally on the shaft 61 by means of a pin 101 carried by arm 102 which is mounted on transverse shaft 103 (Figs. 8, 9, and 11). Movement of the shaft 103 can be controlled by a number of means, such as depression of conventional clear key, not shown, or by automatic mechanisms which form no part of the present invention. In addition clearing can be controlled through mechanism associated with my invention as will later be described.

A clearing cam 110 of conventional design (see Fig. 11) is mounted on the clutch sleeve 99, whereby the cam will be given a single cycle of rotation when the shiftable collar 96 is moved rearwardly so that the teeth 97 thereon engage the teeth 98 of the sleeve 99. Associated with the cam 110 is a follower roller 111 rotatably mounted on an arm 112 that is pivotally mounted on the back frame plate 25. The upper end of the arm 112 is provided with a slot 113 which embraces a roller 114 mounted on the slide 115 suitably supported from the rear plate, as shown. The slide 115, and arm 112 are normally held in their leftward position (to the right in Fig. 11) by a suitable spring 116. The slide 115 is provided with an upwardly extending bent arm 117 (see also Fig. 2) which is adapted to cooperate with suitable ordinal grooves 121 in the clearing rack 92. The slide and its integral arm 117 are normally urged outwardly from the rear plate of the machine by a suitable leaf spring 118. The slide 115 is also provided with camming projections 119 which are associated with cam plates 120 supported in spaced relationship from the rear frame plate as by spacers 122. The clearing mechanism is held in its full cycle position by a suitable centralizer, such as spring-urged arm 123 engaging a corresponding flat on the shifting sleeve 99.

It will be obvious that as the clutch members 96 and 99 are engaged, the cam 110 will be given a single cycle of rotation, thereby rocking the arm 112 and slide 115 (first counter-clockwise and then clockwise in Fig. 11). Movement of the slide 115 toward the left in Fig. 11 causes the cams 119 to engage the cam plates 120, thereby forcing the slide and its integral arm 117 inwardly (counter-clockwise Fig. 2), whereby the tip of the arm 117 will enter one of the ordinal milled grooves 121 in the rack 92. Thereupon the rocking of arm 111 and the translation of slide 115 causes the rack 92 to be translated for a clearing stroke. It will be obvious that other means for clearing the register 87 in any carriage position could be used and it is to be understood that the mechanism here shown and described is merely one embodiment of such a clearing mechanism.

*Tens-transfer.*—The accumulator register is provided with a conventional tens-transfer mechanism which, in the embodiment shown, comprises a tens-transfer cam 125 mounted on the dial shaft 86. As the dial 87 moves between the 9 and 0 positions a nose on the cam 125 rocks an arm 126 suitably mounted on the carriage frame 88, thereby moving in the next higher order, a flanged collar 127 and its integral tens-transfer gear forwardly on square shaft 52. When the gear and its integral collar 127 are moved forwardly the gear lies in the plane of the tens-transfer actuator 128, which has a single tooth. In this manner the square shaft 52 is given a single increment of movement by the tens-transfer actuator 128. The tens-transfer mechanism is restored to its normal inoperative position by the cam 129 in a conventional manner.

The carriage of the accumulator of the calculator of my invention will normally contain therein a suitable counter mechanism and a suitable carriage shifting mechanism. As these mechanisms have no part of my invention they have been omitted from the drawings and description, as have other mechanisms not material to an understanding of the present invention.

STORAGE AND TRANSFER MECHANISM

The mechanisms hereto described are, for the most part, conventional and are shown and described in the patents above referred to. They have been briefly mentioned as they are associated with the mechanism of my invention and reference must be had to them for a clear understanding of my new mechanism. My invention relates primarily to a mechanism by means of which I am enabled to utilize the conventional machine heretofore briefly described: (1) as a duplex calculator, that is one in which totals accumulated in the register dials 87 may be transferred to another register for the accumulation of grand totals; (2) for the storing of a constant value for the keyboard in a mechanism associated therewith and which can be transferred to the keyboard selectively at the will of the operator; and (3) a mechanism by means of which a value may be transferred from the accumulator register dials 87 into a storage mechanism from which it may be selectively used when desired, at the will of the operator, to insert values into the keyboard. This mechanism and controls therefor will now be described.

Figure 5:
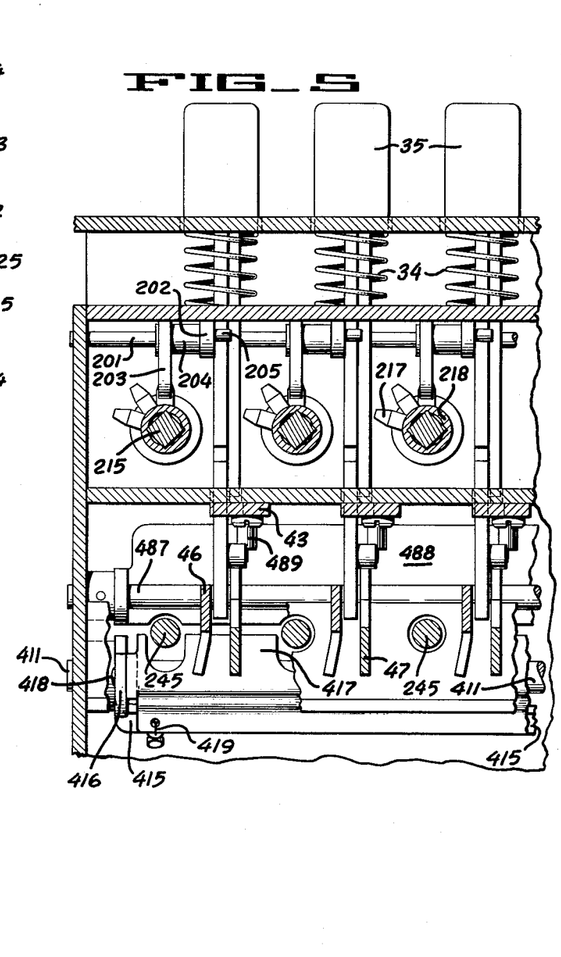
Fig. 5 is an enlarged, partial detail view of a portion of the keyboard taken on a transverse plane through the keyboard, such as behind the number "2" key as indicated by the line 5—5 of Fig. 1.
Figure 12:
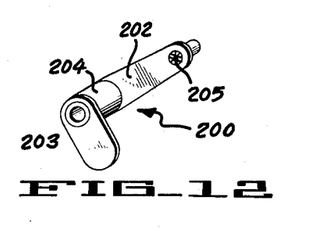
Fig. 12 is an isometric view of one of the bellcranks associated with the constant factor mechanism of my invention.
Figure 13:
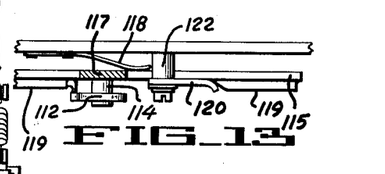
Fig. 13 is a partial, cross-sectional plan view of a portion of the carriage shifting mechanism, taken along the plane indicated by the lines 13—13 of Fig. 11.

*Storage mechanism.*—Associated with each key stem 36 or 38 is a bellcrank member indicated generally at 200 (Figs. 1, 2, 5, and enlarged detail in Fig. 12). These bellcranks 200 are mounted on transverse shafts 201 which lie forwardly of the associated key stems. The two arms of the bellcrank 200 must lie in two spaced planes, as the horizontal arm 202 must lie adjacent the associated key stems while the vertical arm 203 lies a short distance away. Obviously, the bellcrank can be a single stamping with the arms bent to lie in the proper planes. However, I have shown the bellcranks (Fig. 12) as comprising the horizontal arm 202 and the vertical arm 203, separated by a sleeve 204 which is rotatably mounted on the shafts 201. The horizontal arm 202 carries a pin 205 which is embraced in a slot 206 in the adjacent key stem. It is thus obvious that as a key is depressed its associated bellcrank 200 rocks on the shaft 201, and, conversely, clockwise rocking of the bellcrank will cause depression of the associated key.

There is a longitudinally extending storage shaft 215 associated with each order of the keyboard. In my preferred form this shaft is a square shaft shown in Figs. 1, 5 and 6. The shaft 215 is rotatably and longitudinally slidably mounted in the front cross plate 24 and intermediate crossbar 26, as shown in Fig. 1. The axis of the shaft lies in the plane of the vertical arm of the bellcranks 200. A plurality of pins, studs, or other suitable projections, 217 are spaced along the shaft 215 (one for each key), the distance between pins being equal to the distance between the vertical arms 203 of the bellcranks 200. It will be obvious to those skilled in the art that the shaft 215 could be a round one and that the projections could be pins inserted through diametrical holes in the shaft. However, I prefer that the projections 217 be an integral part of collars 216 which are slidably mounted on the square shaft and which are held in fixed spaced relationship by means of spacing sleeves 218. The pins 217 are equiangularly and progressively staggered around the shaft as shown in Figs. 1 and 5 (in a conventional machine having nine numeral keys 35 and an ordinal clear key 37, the ten projections are angularly spaced 36° from one another). In Figs. 1 and 5, the shaft, and its associated pins, is shown in the zero position in which the forward pin 217 lies in the same plane as the vertical arm 203 of the bellcrank 200 associated with the 0, or ordinal clear key stem 38. In this position the projection, or stud, 217 associated with the 1 key 35 lies at an angle of 36° clockwise from the zero pin (counter-clockwise as viewed in Fig. 5), the 2 pin lies at an angle of 72° from the zero, etc. In this way the shaft 215, which can come to rest in any of the ten equiangular positions around the circle, will, in any angular position, have one (and only one) pin 217 lying in the same plane as, and immediately behind, the vertical arm 203 of the associated bellcrank.

The shafts 215 are spring-urged toward the front of the machine, and are normally latched in their rearward position, as will hereinafter be described. In this normal position of the shafts, the pins will lie behind their respective bellcranks when the keys are in their raised position. It will be obivous that forward translation of the shafts 215 will cause the one upright stud 217 on each to rock its associated bellcrank 200 (clockwise in Fig. 1) to depress the associated keys. In this manner the unlatching of the spring-urged storage shafts 215 will cause the value stored in the shaft 215 to be directly impressed upon the keyboard by the depression of the corresponding keys.

A suitable collar 219 (Figs. 2 and 4) is rigidly secured to the rear ends of the shafts 215, which collar is rotatably and slidably journalled in the intermediate crossframe member 26. Each collar 219 carries a ten tooth star wheel 220 (see Fig. 4) and an integral flange 221 spaced a short distance from the star wheel 220 (Fig. 2). A round rod 222 mounted on the lower end of a bail 223 lies in the space between the star wheels and the flanges, as is shown in Fig. 2. The bail 223 is rigidly secured to a rocking shaft 224 so that rocking of the shaft (clockwise in Fig. 2) causes the sleeves 219 and the shafts 215 to move forwardly in the machine. In the forward position the star wheels 220 are properly centralized by engaging the chamfered pin 225 mounted in the cross frame bar 26. It is obvious that the rocking of the shaft 224 (clockwise in Fig. 2) will cause the entry of a value in the keyboard through the forward translation of shafts 215 and the upright pin on each shaft engaging its associated bellcrank 200 to depress the corresponding key. Conversely when the shaft 224 is restored to the counter-clockwise position shown in Fig. 2, the collars 219 and shafts 215 are returned to their rearward position, in which position the pins 217 lie to the rear of the associated vertical arms 203 of the bellcranks 200—thereby freeing the key stems from the control of the storage shafts 215.

Figure 7:
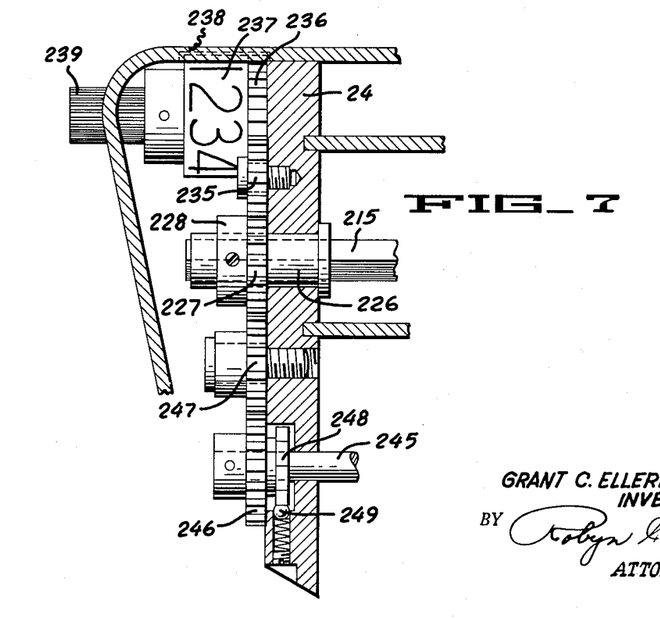
Fig. 7 is an enlarged cross-sectional view of the extreme front portion of the machine of my invention, such as taken along a longitudinal plane indicated by the line 7—7 of Fig. 6.

The forward end of the control shaft 215 is slidably mounted in a collar 226 rotatably mounted in the front crossframe member 24 (see Fig. 7). Preferably the sleeve 226 is flanged as shown in this figure to prevent longitudinal translation thereof during movement of the shaft 215. The bearing sleeve 226 carries a pinion 227 rigidly secured thereto as by means of the collar 228 and a suitable set screw as shown in this figure. By this means the shaft 215 can slide in the bearing sleeve 226, but rotation of the shaft will cause similar rotation of the sleeve 226 and its integral gear 227—the gear not being permitted to become unmeshed from the associated gears of the train shown in Figs. 6 and 7.

An idler gear 235 constantly is enmeshed with the gear 227, as shown in Figs. 6 and 7. The idler gear 235 in turn meshes with a dial gear 236 which is rigidly secured to a numeral wheel or dial 237, the figures of which are viewable through a suitable window 238 in the machine cover 31. A twirler knob 239 is rigidly secured to the dial 237, or may be formed integral therewith, so that values may be inserted into the forward, or storage dials, which comprise what will be known herein as the storage register. Any setting of a value into the storage dials 237 automatically sets the same value into the storage mechanism which comprises the square shaft 215 and the actuating studs 217 mounted thereon. Thus, twirlers 239 constitute one means by which a value may be inserted into the storage mechanism, and the dials 237 show the value which is then standing in the storage mechanism.

*Storage mechanism drive.*—A storage drive shaft 245 is also associated with each order of the keyboard, such shaft extending longitudinally between the front bearing plate 24 and the intermediate bearing plate 27 as shown in Fig. 1. At its forward end (as shown particularly in Figs. 6 and 7) the shaft has pinned thereto to a suitable pinion 246 which meshes with an idler gear 247 mounted on the front bearing plate. The idler 247 in turn meshes with the pinion 227 rigidly secured to the storage shaft 215. Preferably the shaft 245 will be provided with a star wheel 248 having ten circumferential depressions thereon which engage the spring-pressed ball detent 249. The rear end of the drive shaft 245, as shown best in Fig. 2, carries a pinion 250 rigidly secured thereto. Through the gearing shown and described the drive shaft 245 and the storage shaft 215 must rotate in unison, and it is preferred that the gears be such that each will rotate a full cycle and that they be connected by gearing having ten teeth each so that each shaft 215 and 245, and storage dial 237 will make a complete revolution for each addition or subtraction of ten digits.

The forward end of each square shaft 52 is milled to cylindrical shape, as indicated at 255 (Fig. 2). A collar 256 is rotatably but non-slidably mounted on the cylindrical portion of square shaft 52. The collar 256 carries a pinion 257 which meshes with the pinion 250 on the storage drive shaft 245. Also integral with the collar 256 is a mutilated clearing gear 258 which has one tooth removed, as at 259 (Fig. 4) whereby the storage mechanism can be rotated to a zero position at the option of the operator. The collar 256 also carries an integral clutch plate 260 which has ten equally spaced slots milled in the edge thereof. Slidably mounted on the square shaft 52 is a collar 261 which is provided with a tongue 262 adapted to engage a slot in the clutch plate 260. The collar 261 is provided with an annular groove 263 which embraces the rounded ends of the teeth of a clutch operating comb, or gate, 264. The gate 264, in turn, is rigidly secured to a transverse shaft 265.

It is obvious that the collar 261 on square shaft 52 will always rotate therewith, and when the collar lies in its forward position, the tongue 262 will engage one of the slots of the clutch plate 260, thereby rotating the collar 256 and shaft 245 synchronously therewith. It is also obvious that the position of the collar 261 to either engage or disengage the collar 256 from the square shaft 52, is under the control of shaft 265. It will further be obvious that if the selection mechanism is positioned to enter a value into the register and the shaft 265 is rocked forwardly (clockwise in Fig. 2) the cycling of the machine to drive the actuators 60 will simultaneously rotate the storage mechanism drive shaft 245 in synchronism with the square shaft 52. Thus the value entered into the accumulator dials 87 will also be entered on the storage dials 237, and the control shaft 215 will be rotated to position the stud 217 associated with the depressed key in the plane of the bellcrank 200. Thus, values can be entered into the storage mechanism directly from the keyboard when desired.

It is also obvious that if the plus-minus spool 70 is positioned forwardly so as to engage the minus gear 72 with the accumulator gear 85, and the clearing register is cleared by operation of the rack 92, the shafts 52 will be rotated differentially with the clearing of values from the accumulator dials 87. If at the same time the clutch shaft 265 is rocked forwardly to engage the clutch collars 261 and 260, the value cleared out of the accumulator 87 will be transferred to the storage dials 237 and simultaneously inserted in the storage mechanism. It can be noted at this point that while a tens-transfer mechanism could be utilized in connection with the storage dials 237, I prefer to omit such a mechanism and effect tens-carry in the accumulator dials 87. This is done, when the machine is being used as a duplex machine, by first transferring the value in the storage dials 237 into the accumulator register 87 and immediately clearing the values out of the accumulator dials 87 and transferring them to the storage dials 237.

Figure 4:
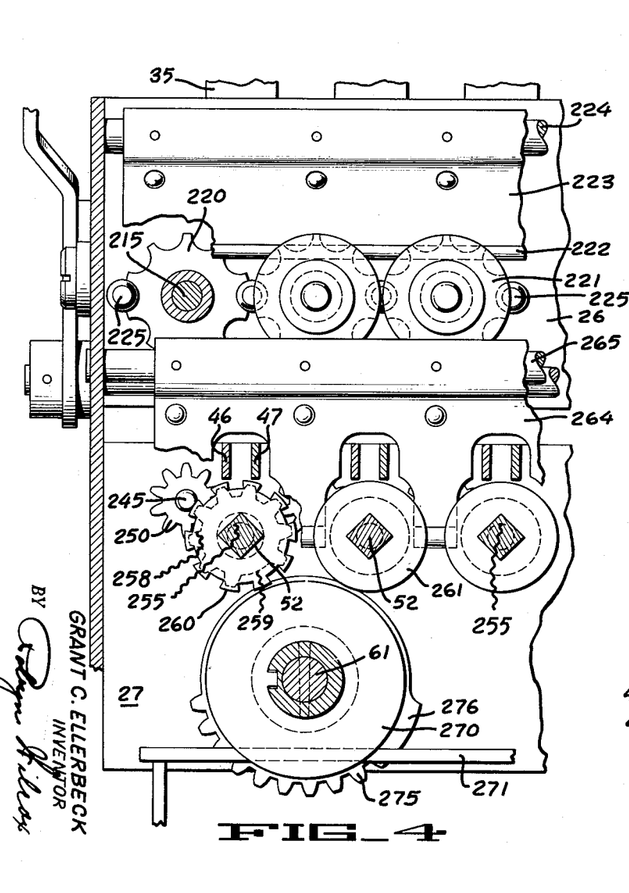
Fig. 4 is an enlarged, partial detail view taken on a transverse plane immediately behind the keyboard, such as that indicated by the lines 4—4 of Fig. 1.

*Storage clearing.*—I also provide means for clearing the values out of the storage dials 237 and the storage mechanism associated therewith. A preferred form is shown particularly in Fig. 2. A flanged collar 270 is slidable but non-rotatably mounted on the forward end of the actuator shaft 61. This collar is positioned by a transverse gate 271 mounted on arms 272 which are rigidly secured to a transverse shaft 273 (Fig. 1). The collar 270 carries a pair of mutilated clearing gears 274 (one for each order served by each actuator drive shaft 61). Each such clearing gear 274 is provided with nine teeth 275 and a Geneva block 276 (as shown in Fig. 4). If the storage mechanism is displaced from the zero position shown in Fig. 4 the rotation of the gear 274 (when that gear is shifted rearward into the plane of mutilated gear 258) will cause the teeth 275 thereon to mesh with the mutilated clearing gear 258 mounted on the collar 255. The gear 258 will be rotated by the gear 274 until the mutilated portion 259 lies adjacent the gear 274, in which position the storage mechanism will be at its zero position. It will be obvious that a stop gate, not shown herein but similar to that described in connection with the clearing of the register dials in the Patent No. 2,229,889, above referred to, could be utilized in connection with the clearing of the storage mechanism.

OPERATION CONTROLS

*Storage constant.*—It has heretofore been mentioned that a value may be transferred from the keyboard into the storage mechanism at the will of the operator. This transfer of values from the keyboard into the storage mechanism takes place when the auxiliary clutch 260, 261 is engaged and the machine given a cycle of operation as heretofore explained. The engagement of the clutch 260, 261 is under the control of shaft 265, as heretofore explained. The mechanism for controlling the rocking of shaft 265, to thus enter values from the keyboard into the storage mechanism, is shown particularly in Fig. 8. A control key 300 is mounted on a suitable key stem 301. The key stem 301 is mounted for vertical sliding movement on the left frame plate 22 by suitable pin-an-slot connections 302, and is urged to its raised position by a suitable spring 303 engaging the ear 304 on the key stem. The key stem 301 carries a pin, or rivet, 305 which engages the horizontal arm of a bellcrank 306. The bellcrank 306 is pivotally mounted on the frame plate 22 by any suitable means, such as screw 307. The lower, or vertical, arm of the bellcrank 306 is provided with a slot 308 which embraces a pin 309 mounted in the forward end of link 310. The link 310 extends rearwardly and is pivotally secured to an arm 312 by any suitable means, such as rivet 311. The arm 312 is rigidly secured to the clutch control shaft 265.

The link 310 also is provided with a detent pin 313 which is engaged by a suitable detent 314 pivotally mounted on the frame plate 22. The detent arm 314 is urged into engagement with the pin 313 by a suitable spring 315.

The arm 312 extends downwardly from the link 310 to a position near the periphery of a cam 317 mounted on the drive shaft 63 immediately to the left of the frame plate 22. The cam 317 carries a pin 316 which engages the lower end of the arm 312 immediately before the termination of the cycle of operation. Thus, the control linkage and arm 312 and shaft 265 are returned to normal, or clutch disengaged, position as the cycle terminates.

By the means shown, the depression of the control key 300 is operative to rock the clutch shaft 265 to cause engagement of the clutch plates 260 and 261, and the link 310 is held in the adjusted position by the detent 314. By means not here shown, the rocking of the shaft 265 will cause the energizing of the drive motor, not shown, and the engagement of the main drive clutch, also not shown. The consequent cycling of the machine will cause the value inserted on the keyboard to be transferred into the storage mechanism as heretofore described.

*Clear storage.*—Means are also provided for clearing, or zeroizing, the storage mechanism. Preferably this mechanism also is mounted on the left frame plate 22, as is shown in Fig. 8. This mechanism is preferably under the control of a suitable clearing key 325 which is mounted on the upper end of a key stem 326. The key stem 326 is mounted for vertical sliding movement on the frame plate 22 by suitable pin-and-slot connections 327 and is urged to its raised position by a suitable spring 328 tensioned between the key stem and a pin on the frame plate, as shown. The key stem 326 carries a pin, or rivet, 329 which engages the upper edge of the horizontal arm of a bellcrank 330 pivotally mounted on the frame plate. The lower, or vertical, arm of the bellcrank 330 is pivotally secured to a short link 331 by any suitable means, such as stud 332. The rear end of the short link 331 is pivotally secured to the upper end of a two armed lever 333 by any suitable means, such as pin 334. The two armed lever 333 is rigidly secured to the shaft 273 (see also Fig. 1). It is obvious, therefore, that depression of the clear key 325 rocks the bellcrank 330 clockwise, thereby rocking the lever 333 and its shaft 273 counter-clockwise. The rocking of the shaft 273 (clockwise in Fig. 1) as heretofore explained, moves the storage clearing collar 270 rearwardly on the actuator shaft 61 so that the clearing gears 274 thereon mesh with the ordinal mutilated clearing wheels 258 previously described. Therefore the operation of the motor and drive shaft 63, by means not here shown, is effective to cause the return of the storage mechanism to its zero, or cleared, position.

The lower arm of the lever 333 carries a pin, or rivet, 336 adapted to engage latching notches in a detent arm 337 which is pivotally mounted on the frame plate by any suitable means such as screw 338. The detent arm is urged clockwise into engagement with the pin 336 by a suitable tension spring 339.

A restoring arm 340 is rigidly secured to a collar 341 integral with the lever 333 and extends forwardly in a plane adjacent to the restore cam 317. A pin 342 on this cam engages the arm 340 shortly before the end of the cycle, when the lever 333 and integral arm 340 have been rocked to clearing position (counterclockwise in Fig. 8). Such engagement restores arm 340 and integral lever 333 to disengaged position.

Figure 10:
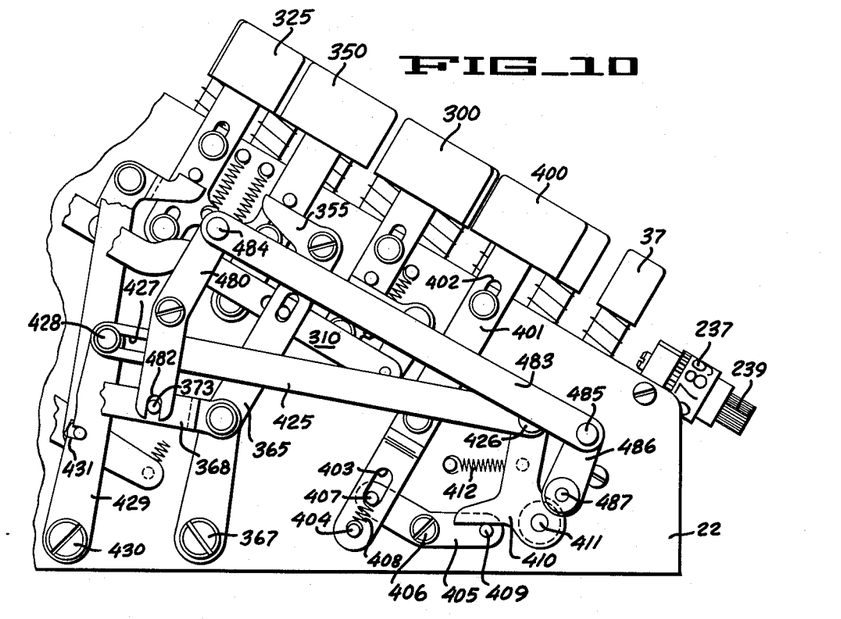
Fig. 10 is a partial view of the front portion of the left frame plate, taken from the left, and in effect is an extension of the partial views shown in Figs. 8 and 9.

*Interregister transfer.*—It was previously mentioned that the mechanism of my invention was also operative to transfer values from the accumulator dials 87 into the forward storage dials 237, using the storage mechanism heretofore described. This operation is under the control of a suitable transfer key 350, the mechanism associated with which is best shown in Figs. 8 and 10. The key 350 is mounted on the upper end of a key stem 351 which is supported for vertical sliding movement on the frame plate 22 by suitable pin-and-slot connections 352. The key stem 351 is urged to its raised position by a suitable spring 353 tensioned between a pin on the key stem and a pin on the frame plate, as shown. The key stem 351 carries a pin 354 which engages the upper edge of a horizontal arm of a bellcrank 355 which, in turn, is pivoted on the frame plate by any suitable means, such as screw 356. The lower end of the vertical arm of the bellcrank 355 has a pin 357 which is embraced by a slot 358 in the link 310. The depression of the key 350 rocks the bellcrank 355 to translate the link 310 forwardly, thereby rocking shaft 265 to cause engagement of clutch members 260 and 261 (see Fig. 2). Thus subsequent differential rotation of shaft 52 will be operative to rotate the drive shaft 245 of the storage mechanism by a similar amount and also rotate the storage dials 237 the same differential amount.

A lever 365 is pivotally mounted on the side plate 22 by any suitable means, such as screw 367. The upper end of this lever 365 is provided with a slot 366 which also embraces the pin 357 on the bellcrank 355. A link 368 is pivotally secured to the lever 365 at an intermediate point on the latter by a suitable pin 369. This link 368 extends rearwardly to a point adjacent the rear of the machine. The rear end of the link 368 is pivotally mounted on an arm 370 by any suitable means, such as pin 371. The arm 370 is rigidly secured to the clear clutch shaft 103 heretofore described. It is thus obvious that depression of the key 350 will also rock the clear clutch shaft 103 to cause engagement of the clear clutch and the consequent clearing of the accumulator dials 87.

In this operation of transferring a value from the accumulator dials 87 to the storage dials 237, it is necessary that the selection mechanism be entirely cleared. It will be recalled that if any key of the keyboard is depressed one of the selection slides 46 or 47 will be translated forwardly, thereby bringing one of the selection gears 50 or 51 into alignment with one of the teeth on the actuator drums 64. In the interregister, or back transfer, operation the shaft 52 is deriving rotation from the clearing of the accumulator dials 87, so it is obvious that if the selection gears 50 or 51 were out of zero position there would be a jamming due to the actuator shafts rotating at different times and different differential amounts. It is therefore essential that the keyboard be cleared during the first part of the depression of the key 350. The mechanism for clearing the keyboard is shown particularly in Fig. 10. A lever 480 is pivotally mounted on the frame plate 22 by any suitable means such as screw 481. The lower end of the lever is bifurcated at 482, which bifurcation embraces a stud 373 on the link 368. The upper end of the two-armed lever 480 is pivotally connected to a forwardly extending link 483 (Fig. 10) by any suitable means such as pin 484. The right end of the link is supported by a pivotal connection 485 to a short arm 486. The arm 486 is rigidly secured to a transverse shaft 487 which extends across the front of the machine (see Figs. 1 and 5). On the inside of the machine a bail 488 is rigidly secured to the shaft 487. Associated with the bail is a stud 489 mounted on the lower forward end of each of the latch slides 43 (see particularly Fig. 5). Thus depression of transfer control key 350 operates through the linkage described to rock shaft 487 and gate 488. The rocking of gate engages the pins 489 and translates all of the latching slides 43 rearwardly, thereby releasing all of the depressed keyboard keys and clearing the selection mechanism.

Depression of the control key 350 and the consequent forward translation of link 368 also is operative to connect the register dials 87 to the square shafts 52. This can be secured in a variety of ways but a preferred form is shown in the figures, particularly Fig. 8. A lever 380 is pivotally mounted at the rear of the left frame plate 22 by any suitable means, such as stud 387. The arm 380 carries a pin 381 which is embraced in a slot 372 in the link 368. It is thus obvious that the forward movement of the link 368 is effective to cause rocking of the lever 380 (clockwise in Figs. 8 and 9). The lever 380 is provided with a triangular slot 382 which embraces a pin 291 on the latching arm 280. The slot 382 is formed with a cam edge so that the clockwise rotation of the lever causes depression of the latching arm 280 into the subtract position. Preferably the arm 380 is held in either adjusted position by a suitable detent, such as rocker arm 385 pivotally mounted on frame plate 22. A pin 384 on one arm of the rocker is adapted to engage the upper edge 383 of arm 380, the rocker being urged in a clockwise direction (in Fig. 8) by a suitable spring 386.

Thus the rocking of the lever 365 is effective, also, to cause the engagement of the minus gears 73 with the accumulator gears 85 so that the consequent clearing of the accumulator dials will transfer the values therein, through the gears just mentioned, into square shaft 52. As previously mentioned, the depression of the key 350 has already caused the engagement of the clutch members 260 and 261 so that the differential rotation of square shaft 52 effectively transfers the values in the accumulator dials 87 into the storage mechanism and into the forward, or storage, dials 237.

The depression of the transfer key 350 causes the following various steps to take place simultaneously: The storage drive shaft clutch 260, 261 is engaged; the clearing bail 488 is rocked to clear all values from the keyboard; the clear clutch control shaft 103 is rocked to engage the clear clutch; and the arm 380 is rocked to cause the plus-minus spool 70 to be shifted to the subtract position. Thereafter the motor is started, thereby clearing the value from the accumulator register dials 87, which clearing operation is operative, through the means described, to transfer such value into the storage mechanism.

In my preferred form I do not use a tens-transfer mechanism in the forward, or storage, register. The machine, however, can be used as a duplex calculator, using the storage dials as the grand total register, by transferring the values first from the storage register 237 into the accumulator dials 87 (which are provided with a tens-transfer mechanism previously described) and immediately transferring the values from the accumulator dials back into the storage dials. This requires a two-step, or two-cycle, operation: First transferring values from the storage dials into the accumulator dials and then back again. This two-step process can be controlled in a variety of ways. It could be done by a separate two-stage program control, suitably operated. It can also be done by means of first using the constant factor mechanism now to be described.

*Constant factor actuation.*—A manually operated mechanism is also provided to permit the use of a constant, or stored value, when desired by the operator. Preferably this mechanism will be easily operated and simple in construction. Further, I prefer that it operate only when the keyboard is entirely clear. Obviously if a value is inserted in the keyboard, under normal conditions, the depression of a constant control key would be a misoperation.

Preferably the mechanism for inserting a constant into the keyboard will be under the control of a manually depressible key 400 (Fig. 10). The key 400 is mounted on a suitable key stem 401 which is supported on the left frame plate 22 by suitable pin-and-slot connections 402. The lower end of the key stem 401 is preferably provided with a slot 403 and a short stud 404. Associated with the lower end of the key stem 401 is a two-armed lever 405 pivotally mounted on the supporting plate 22 by any suitable means such as screw 406. The left end of the lever is provided with a short pin, or stud, 406 preferably lying within the slot 403. The stud 404 on the key stem and the stud 407 on the lever are connected by a suitable spring 408. The other end of the lever 405 is also provided with a pin 409 which engages the lower edge of bellcrank 410. The bellcrank lever 410 is rigidly secured to a shaft 411 extending transversely across the front of the machine. The bellcrank 410 and shaft 411 are rocked rearwardly (counter-clockwise in Fig. 10) by a suitable spring, such as tension spring 412.

On the interior of the machine, adjacent the front end of the keyboard, the shaft 411 is provided with a bail 415. The bail 415 is mounted on integral arms 416 which are rigidly secured to the shaft 411 so that the bail 415 rocks with the bellcrank 410 (Fig. 1). The rearward edge of the gate 415 supports a live tip, or gate-shaped pawl, 417 which is pivotally mounted on the gate 415, as by shaft 418. This live tip is held in its rearward (clockwise position shown in Fig. 1) by a suitable spring 419, but can be rocked counter-clockwise. This live gate 417 lies immediately below and in front of the ordinal selection slides 46 and 47. If any slide of the keyboard has moved forwardly as much as one unit space the slide will overlie the live tip 417 and will therefore block rotation of the gate 415 and shaft 410. In such a circumstance the key 400 can be depressed but the shaft 411 being locked, neither bellcrank 410 nor two-armed lever 405 may be rocked by depression of the key—the spring 408 yielding to permit depression of the key, but the key is inoperative to initiate any action. If, on the other hand, no value has been inserted in the keyboard all of the selection slides 46 and 47 will lie in their normal rearward position. In this condition the live gate 417 may rock upwardly, thus permitting rocking of the shaft 411, and the bellcrank 410 by depression of the key 400. The rocking of the bellcrank 410 initiates the cycle of operations controlled by this key as will now be described. It can be noted however, that if a value is inserted in the keyboard, then depression of the key 400 is idle as the spring 408 yields, but the control mechanism cannot be tripped as one of the selection slides 46 or 47 will overlie the live gate 417 and prevent its rocking and the rocking of shaft 411.

A rearwardly extending link 425 is pinned by any suitable means, such as stud 426, to the upper end of the vertical arm of the bellcrank 410. The rearward end of this slide is provided with a suitable slot 427 which embraces a stud 428 on the upper end of a latching arm 429. The latching arm 429 is pivotally mounted on the frame plate 22 as by screw 430. This latching arm is provided with a latching notch 431 and is urged in a rearward direction (counter-clockwise in Figs. 9 and 10) by a suitable spring 432.

It will be recalled that the shaft 224 carries the gate 223 which controls the longitudinal position of the constant factor, or storage, shaft 215 (Fig. 1). The rocking of the shaft 224 is controlled by mechanisms shown in Fig. 9 which comprise the bellcrank 435 rigidly secured to the shaft 224. The bellcrank is urged in a counter-clockwise direction in Fig. 9 by a suitable spring 436. One arm of the bellcrank 435 is pivotally connected to a latching link 437 as by pin 439. The lower end of the latching link 437 is pivotally connected to a three-armed lever 440 by a suitable short stud 438. The stud is extended so as to form a latching pin for cooperation with the slot 431 in the latching arm 429. It is thus obvious that the depression of the key 400 will rock the latching arm 429, provided no value is inserted in the keyboard selection mechanism, thereby releasing the link 437 and permitting the shaft 424 to rock (counter-clockwise in Fig. 8, clockwise in Fig. 1). As the spring 436 is relatively strong, the release of link 437 permits the force of spring 436 to snap the constant factor, or storage, shafts 215 forwardly and thereby insert the value indicated by the storage dials 237 into the keyboard selection mechanism, as above described.

The three-armed lever 440 just mentioned is pivotally mounted on the side plate 22 by any suitable means, such as screw 441. It is normally urged in a counter-clockwise direction by a relatively strong spring 442. One arm of the lever carries a roller 443 adapted to cooperate with cam 317 to restore the latching mechanism immediately after a value has been inserted, and latched, in the keyboard. The cam 317 has a suitable depression 318 into which the roller rocks upon the release of the lever 440. Simultaneously with the rocking of the lever 440 the value set on the constant shaft 215 is inserted into the selection mechanism. Thereafter the machine starts to cycle and the rotation of the shaft 63 and cam 317 immediately restores the mechanism just described, and the constant factor shafts 215, to their latched position.

The third arm of the three-armed lever 440 is pivotally connected to a control link 450 by any suitable means such as pin 444 (Fig. 8). The rear end of the link 450 is provided with a slot 451 which embraces a pin 452 on bellcrank 453 pivotally mounted on shaft 387. The control link 450 is provided with an arcuate slot 454 which has an enlarged portion 455 as shown in Figs. 8 and 9. The slot 454 encloses a pin 343 on the lower end of lever 333 which controls the positioning of the storage clear mechanism shaft 273. It is obvious that the rocking of the three-armed lever 440 will pull the control link 450 forwardly. If the link is either in its extreme raised or extreme lowered position the translation of the control link 450 will be effective to cause rocking of shaft 273 thereby positioning the storage clearing gears in their rearward, or operative, position. On the other hand if the connecting link is in its intermediate position the extended, or enlarged, portion 455 permits the translation of the connecting link 450 without effecting the rocking of shaft 273.

The positioning of the control link 450 is determined by the angular position of the bellcrank 453. The bellcrank in turn is rocked by a link 456 pivotally connected thereto. The link in turn is pivotally connected to an arm 457 by any suitable means, such as pin 458. The arm 457 is rigidly secured to a transverse control shaft 459. The angular position of the control shaft 459 is determined by a lever 460, preferably mounted on the right side frame plate 21 (see Fig. 3). This lever carries a pin 461 which is adapted to engage one of the notches 462 in a detent arm 463. The detent arm is pinned to the frame plate 21 by any suitable means, such as screw 464, and is urged in the counter-clockwise direction by a suitable spring 465. Thus the lever 460 is held in any one of its adjusted positions. In the embodiment shown three adjusted positions are possible to correspond to normal operation (rearward position of lever 460 in Fig. 3, and lowered position of connecting link 450 shown in Fig. 9); a constant (intermediate position of lever 460, and intermediate position of control link 450); and accumulate (forward position of lever 460, and raised position of control link 450, clockwise from the position shown in Fig. 9). It is obvious that in the first and third positions the mechanism is effective to cause clearing of the storage mechanism simultaneously, while in the second, or intermediate, position the value stored in the constant factor, or storage, mechanism is not changed, but can be used whenever desired.

It will be obvious to those skilled in the art that when the constant value control key 400 is depressed, the engagement of the clutch and closing of the motor switch mechanisms should be slightly delayed, in order to permit the value set in the storage mechanism to be set on the keyboard and into the selection mechanism controlled thereby. Conventionally, the depression of an operation control key causes immediate closing of the motor switch and engagement of the main drive clutch. However, when a value is to be set by the depression of the constant value control key, it will be obvious that there must be a slight delay in initiating machine operation.

Preferably the main drive shaft 63 will have a suitable centralizer, so that all of the mechanisms herein described are returned to, and stopped in, their full cycle positions. Many such mechanisms could be suggested, but I prefer to use the simple form shown in Fig. 9. In my preferred embodiment, I utilize a centralizer cam 290 rigidly secured to shaft 63. This cam has a centralizing depression 496. A cam follower comprising a bellcrank 497 and a roller 498 are pivotally mounted on the side frame 22, as on shaft 273. The follower is urged into engagement with the cam 290 by a relatively strong spring 499. The force of the spring 499 is such as to effectively centralize the shaft 63, and mechanisms associated therewith, in the full cycle position shown.

In the machine of my invention it is possible to store a value in the storage mechanism, either by direct insertion through the twirler knobs 239 or by inserting a value in the keyboard and depressing the storage key 300. The value so inserted in the storage mechanism will be registered on the storage dials 237. At any time thereafter the value so set can be used to return such value to the keyboard by depressing the constant actuator key 400. In this manner a constant value may be inserted in the storage mechanism and used at any time desired by the operator. If the operator desires to use another value on the keyboard he may do so without in any way disturbing the setting of the constant factor, or storage, mechanism. Then, when he wishes to insert the constant value onto the keyboard, a depression of the key 400 is all that is required.

It is obvious that the constant so stored in the storage mechanism can be used in any manner that a keyboard value could be used; such as an augend or addend in addition, a minuend or subtrahend in subtraction, a multiplicand in multiplication, and either the dividend or divisor in division. Also, other values may be selected and used from time to time, and when put in the keyboard, disable the automatic entry of the constant value into the keyboard. Thus, the stored value can be used at any time for any purpose, and disregarded completely if desired by the operator.

In this connection, it will be obvious to those skilled in the art that, instead of using a constant value entry key 400, as shown in the drawings, it would be possible to arrange all of the operation control keys (such as a plus bar, minus key, dividend tab key, divide key, or any of the multiplier keys of a conventional machine) so that depression thereof would initiate the tripping of the latch 437. It can be assumed that these control keys will never, in proper operation, be depressed until a value has been entered on the keyboard or until the operator desires to use the stored constant factor. Thus, if the operator desires to use a value other than the stored constant, the operator places the desired value in the keyboard and depresses the operation control key. However, if the constant is desired, the operator merely has to depress the control key and the mechanism will first release the latch 437 to insert the constant into the keyboard, and thereafter enable the clutch and motor switch to be operated in the conventional manner.

On the other hand if the operator desires to use the machine as a duplex calculator, accumulating products on the accumulator dials 87 and accumulating grand totals on the storage dials 237, it is only necessary to set the control lever 460 (Fig. 3) to its forward or accumulate position. The machine is operated in the usual manner, then when a sub-total has been accumulated in the accumulator dials 87, the operator initiates a two-cycle operation: in the first cycle of which the value in the storage dials and storage mechanism is operative to insert such value into the keyboard (as through depression of the constant key, 400) followed by a normal additive cycle of operation, and immediately thereafter to cause operation of the transfer mechanism controlled by the transfer key 350. Thus the value in the storage registers is added into the accumulator dials, which have the necessary tens-transfer mechanism, and is immediately returned to the storage dials as a grand total, leaving the accumulator dials clear for a new cycle of operation.

It will be obvious that if the plus gear 71 is engaged with the accumulator gear 85, and the values standing in the register 87 are then cleared therefrom, the values in the accumulator register will be transferred subtractively to the storage dials 237. It is also possible to transfer a value from the storage dials 237 to the accumulator dials 87 through the constant factor mechanism herein described, either additively or subtractively, through proper positioning of the plus-minus spool 70. Conversely the values in the accumulator dials 87 can be transferred to the storage dials 237 additively or subtractively, although generally they will be transferred additively (by engagement of the minus gear 72 with the accumulator gear 87).

Such flexibility of interregister transfers permits a wide variety of problems to be worked on the machine of my invention. For example, it is possible to readily take discounts from a total secured in the accumulator dials 87. This can be done by first transferring the accumulator value into the storage mechanism, as by depression of the transfer key 350. The multiplier or percentage value is then set in the conventional multiplier unit and the valve stored in the storage mechanism is then inserted in the selection mechanism as by depression of the constant control key 400. Thereafter the initiation of a multiplication operaton results in the computation of the discount, which is regstered in the product dials while the total from which the discount is taken is shown in the storage register.

Another example is the taking of a true credit balance by the following means: When a larger amount is subtracted from a smaller one, a complementary overdraft is secured in the register. For example, if the value of 25 is subtracted from 15 the register will show the value of 90 preceded by a number of 9's. This value can then be transferred to the storage register, as by depression of the transfer key 350. This value is then set in the keyboard, as by depression of the constant control key 400, and subtractively entered into the register to give a positive value of 10 therein. It is obvious that this cycle of operation can be secured by a two-cycle programming system in which the overdraft is transferred into the storage mechanism and then subtractively transferred back into the accumulator.

Heretofore back transfer machines have been known in which a value could be transferred directly from the accumulator register dials 87 into the selection mechanism. The mechanism of my invention has a decided advantage over such machines as the value is transferred from the accumulator into an intermediate storage mechanism to be used thereafter when and as desired. In my machine the values transferred from the register into the storage mechanism are set on the constant factor, or storage, shaft 215 and there retained until the constant storage mechanism is cleared, as hereintofore described. If the value transferred from the accumulator is desired in the keyboard immediately, it is placed there by the depression of the constant factor key 400 and used in whatever manner is desired. If, on the other hand, it is desired to store such a factor for some future use, it remains on the storage shafts 215 until cleared.

Prior art transfer machines were capable of solving problems of the nature of $a \times b \times c$. Such problems are readily solved in my machine: one of the values, such as $a$, can be manually inserted in the keyboard and the other value such, as $b$, set up in the multiplier unit. The machine is then operated through a multiplication operation and the product is secured in the accumulator dials 87. This product is transferred into the storage mechanism as by depression of the transfer key 350 and the third value $c$ set up in the multiplier unit. Thereafter, the stored value, the product of $a$ and $b$, is inserted in the selection mechanism as by depression of the constant key 400. Thereafter, the multiplication of two values gives the product of the three.

Likewise, problems in the nature of $$\frac{a}{b \times c}$$

or the product of two numbers can be divided by the product of two others, such as $$\frac{a \times b}{c \times d}$$

As the latter is more complicated and is illustrative of both types of problems, it only need be mentioned in a problem of this kind. In the first step, the values of the divisor are multiplied by each other to secure the product of $c \times d$ in the accumulator dials. This product is transferred into the storage mechanism as by depression of the transfer key 350. Then the values $a$ and $b$ are set up in the keyboard and multiplier unit, and multiplication is initiated. The product of $a$ and $b$ is secured in the accumulator register 87 and serves as the dividend in the ensuing division problem. Then the stored value of $c \times d$ is inserted into the selection mechanism as by depression of the constant key 400 and division is initiated. It is therefore obvious that the mechanism of my invention is adaptable to many types of problems heretofore not directly solvable without the manual transfer of values fom the register into the keyboard or manually putting them down on paper for future use.

Another use for the mechanism of my invention is to insert a dividend into the storage dials 237 simultaneously with its insertion in the register dials 87. This can be done by the engagement of the auxiliary clutch members 260, 261 (as by the depression of the key 300) with the simultaneous entry of the dividend into the register dials 87 in the usual manner. The auxiliary clutch 260, 261 is disengaged at the end of the entering cycle, as heretofore mentioned. Thereafter the depression of the conventional divide keys, not here shown, initiates a division operation in which the dividend in the register, or accumulator, dials 87 is divided by the divisor placed in the keyboard. However, the storage dials are not affected during this operation so that at the end of the division cycle the dividend will remain in the storage dials 237, the divisor will be shown on the keyboard, the quotient in the numeral dials, and the remainder in the accumulator dials 87.

From these examples, it is obvious that the mechanism of my invention imparts greater flexibility of operation to conventional calculating machines than heretofore known.

I claim:

1. A constant factor mechanism for selectively inserting a predetermined value into an ordinally arranged selection mechanism of a calculating machine comprising a shaft associated with each order of said selection mechanism, operating members operated by translation of said shaft to differentially position the selection mechanism an amount determined by the angular position of said shaft, means for rotating said shaft in accordance with a digit value, and means for translating said shaft.

2. A constant factor mechanism for selectively inserting a predetermined value into an ordinally arranged selection mechanism of a calculating machine comprising a shaft associated with each order of said selection mechanism, operating means on each shaft spirally displaced along the shaft, connecting means operable by engagement with the operating means in a predetermined angular position to set the selection mechanism, means for rotating said shaft in accordance with a digit value, and means for moving said shaft to operate said connecting means.

3. A constant factor mechanism for selectively inserting a predetermined value into an ordinally arranged keyboard of a calculating machine comprising a longitudinally displaceable and rotatable shaft associated with each order of said keyboard, operating projections on each shaft helically displaced around the shaft, means associated with each key of the keyboard operable by engagement of a projection on the shaft to depress the associated key, means for rotating said shaft in accordance with a digit value, and means for longitudinally displacing said shaft.

4. In a calculating machine having an ordinally arranged keyboard, a constant value mechanism for inserting a selected value into said keyboard comprising a longitudinally displaceable shaft associated with each order of said keyboard, operating projections on each such shaft progressively displaced around the shaft, a lever member associated with each key of the keyboard and operable by longitudinal movement of the related projection on said shaft when in a predetermined angular position, means for rotating said shaft in accordance with a digit value, and means for longitudinally displacing said shaft.

5. In combination with a calculating machine having an ordinally arranged keyboard: a longitudinally displaceable and rotatable shaft associated with each order of said keyboard, a projection on said shaft associated with each key of each order, said projections being progressively displaced around said shaft, lever means associated with each key of the keyboard and engageable by the associated projection when the projection is in a selected plane, means for rotating said shaft in accordance with a digit value, resilient means urging said shaft longitudinally to an operative position, latching means holding said shaft in an inoperative position, and manually controlled unlatching means.

6. In combination with a calculating machine having an ordinally arranged keyboard, a constant value mechanism comprising a longitudinally displaceable and rotatable shaft associated with each order of said keyboard, a projection on each shaft associated with each key of such order, said projections being progressively displaced equiangularly around said shaft and longitudinally along said shaft, a bellcrank associated with each key of the keyboard and having one arm engaging its respective key and a second arm lying in the vertical axial plane of said shaft, means for rotating said shaft in accordance with a digit value, resilient means urging said shaft to an operative longitudinal position, latching means holding said shaft in an inoperative longitudinal position, and manually controlled unlatching means.

7. In a calculating machine having an ordinally arranged keyboard, a selection mechanism associated with each order of said keyboard, an accumulator, an accumulator driving means under the control of said keyboard for differentially driving said accumulator negatively or positively, a means for releasably latching a value in said keyboard, and means for clearing the accumulator: a constant value mechanism comprising a longitudinally displaceable and rotatable shaft associated with each order of said keyboard, a projection on each shaft associated with each key of such order, said projections being progressively displaced spirally around said shaft, lever means associated with each key of the keyboard and engageable by the associated projection when the projection is in an upright position, means for rotating said shaft in accordance with a digit value, resilient means urging said shaft to an operative longitudinal position, latching means holding said shaft in an inoperative longitudinal position, and manually controlled unlatching means.

8. Apparatus according to claim 7 comprising also means for clutching said shaft to said accumulator driving means for simultaneous operation therewith, whereby a value set in said keyboard may be entered into said constant value mechanism.

9. The apparatus of claim 7 comprising also manually settable means operable to connect said accumulator with said accumulator driving means for negative operation, to release values set in said keyboard, to clutch said shaft to said accumulator driving means and to operate said accumulator clearing means, whereby a value registered in said accumulator may be entered into said constant value mechanism.

10. The apparatus of claim 7 comprising also means for sensing the setting of a value on the keyboard, and locking means operative when said sensing means indicates a value on the keyboard to block operation of said unlatching means.

11. A calculating machine comprising an ordinal value selection means, a constant value mechanism associated with each order of the selection means, a manually controlled means for activating the constant value storing means to enter the value therein into the selection means, a sensing means operable to sense a zero or nonzero setting of said value selection means, and means operated by said sensing means when sensing a nonzero condition of said selection means for disabling operation of said manually controlled means.

12. A constant value mechanism for selectively inserting a predetermined value into the selection mechanism of a calculating machine comprising a value storage mechanism associated with each order of the selection mechanism, operating means operative to cause operation of the selection mechanism corresponding to the value set in the storage means, a manually controlled means for operating said last-mentioned means, a sensing means operative to sense the presence or absence of a value in the selection mechanism, and means operated by said sensing means when sensing a value in said selection means for disabling operation of said operating means by said manual means.

13. A calculating machine comprising an ordinally arranged keyboard containing depressible keys, an accumulator, a value storage mechanism, means for inserting values in said value storage mechanism selectively from said keyboard or said accumulator, interponent members controlled by said value storage mechanism and settable to depress the keys of said keyboard corresponding to the setting of said storage mechanism, and separately operable means for operating the storage mechanism to set said interponent members.

14. In a calculating machine having a selection mechanism, a constant factor mechanism, an actuating means and an operation key, means operated by said key to operate said actuating means in accordance with a value set in said selection mechanism or alternately in said constant factor mechanism, means for sensing the zero or nonzero condition of said selection mechanism, means controlled by said sensing means for operating said actuating means in accordance with the value in said selection mechanism when sensing a nonzero condition and in accordance with the value in said constant factor mechanism when sensing a zero condition.

15. In a calculating machine having a first factor receiving means, a second factor receiving means, an accumulator register, an actuating means for transmitting values determined by either factor receiving means into said register and an operation key, the combination which comprises means responsive to said key for sensing the zero or nonzero condition of said first factor receiving means, and means controlled by said sensing means for operating said actuating means in accordance with a value set in said first factor receiving means or in accordance with a value set in said second factor receiving means if no value is present in said first factor receiving means.

16. In a calculating machine having an ordinally arranged keyboard, a value selection mechanism positioned by the keys of said keyboard, an actuator, an accumulator register, an accumulator drive means settable by said selection mechanism and operable by said actuator positively or negatively, and means for clearing said accumulator: a constant value mechanism comprising a longitudinally displaceable and rotatable shaft associated with each order of said keyboard, a projection on said shafts associated with each key of such order, said projections being progressively displaced spirally on said shaft, lever means associated with each key of the keyboard and engageable by the associated projection when the projection is in a predetermined angular position, means for rotating said shaft in accordance with a digit value, resilient means urging said shaft to an operative position, latching means holding said shaft in an inoperative position, manually controlled unlatching means, means for connecting said shaft to said accumulator drive mechanism, means for sensing the setting of a value on the keyboard, and means operative when said sensing means indicates a value on the keyboard to block operation of said unlatching means.

17. A constant factor mechanism for selectively inserting a predetermined value into an ordinally arranged selection mechanism of a calculating machine comprising a shaft associated with each order of said selection mechanism, operating means on each shaft spirally displaced along the shaft, connecting means associated with selection mechanism and operable by engagement with an operating means in a predetermined plane to set the selection mechanism, means for rotating said shaft in accordance with a digit value, means for longitudinally displacing said shaft, a sensing means associated with said value selection means, and means operated by said sensing means for disabling displacement of said shaft.

18. In a calculating machine having an ordinally arranged keyboard, the combination which comprises a constant value mechanism comprising a longitudinally displaceable and rotatable shaft associated with each order of said keyboard, a projection on each shaft associated with each key of such order, said projections being progressively displaced around and along said shaft, a lever associated with each key of the keyboard and having one arm engaging its respective key and a second arm lying in the vertical axial plane of said shaft, means for rotating said shaft in accordance with a digit value, resilient means urging said shaft to an operative longitudinal position, latching means holding said shaft in an inoperative longitudinal position, manually controlled unlatching means, a sensing means associated with said value selection means for sensing a value in the value selection means, and means operated by said sensing means for disabling operation of said manually controlled unlatching means.

19. A constant factor mechanism for selectively inserting a predetermined value into an ordinarily arranged selection mechanism of a calculating machine comprising a shaft associated with each order of said selection mechanism, and setting means operable to differentially position said selection mechanism in accordance with the angular position of said shaft, means for rotating said shaft in accordance with a digital value, means for sensing a zero or nonzero value in the selection mechanism, and means operative when said sensing means senses a nonzero value to block operation of said setting means.

20. The apparatus of claim 19 comprising also a rotatable register driving means operative to differentially operate said accumulator, and means for driving said shaft from said rotatable register driving means.

21. The apparatus of claim 20 comprising a register dial on each such shaft so constructed and arranged as to indicate the digital value standing in the respective shafts.

22. In a calculating machine having a differentially positionable selection mechanism, an accumulator register, a storage register, a register driving means operative to differentially operate said accumulator register in accordance with the position of said selection mechanism, means for clearing said accumulator register, a shaft associated with each order of said selection mechanism, operating members operated by translation of said shaft to differentially position the selection mechanism an amount determined by the angular position of said shaft, means for connecting said shaft to said register driving means during either digitation or clearing operation of the latter, and means for translating said shaft, the combination which comprises means for sensing the setting of a nonzero value in the selection mechanism and locking means operative when said sensing means indicates such a value in the selection mechanism to block operation of said means for translating said shaft.

23. In a calculating machine having a differentially positionable selection mechanism, an accumulator register, a register driving means operative to differentially operate said accumulator register, a constant factor mechanism, means for inserting a value in said constant factor mechanism selectively from said selection mechanism or from said accumulator, interponent means operable by said constant factor mechanism to differentially position the selection mechanism an amount corresponding to the value in said constant factor mechanism, and means for so operating said interponent members, the combination which comprises an operation control key, means for sensing the setting of a value in the selection mechanism, means operative by said key to operate said register driving means to thereby operate the same to enter the value into the accumulator determined by the slection mechanism, and means operative when said sensing means indicates a value of zero in the selection mechanism and operated by said key for first operating said interponent means prior to operating said digitation means.

24. In a calculating machine having a differentially positionable selection mechanism, an accumulator register, a storage register, and a rotatable register driving means operative to differentially operate said accumulator register in accordance with the position of said selection mechanism, a means for selectively transferring values from said accumulator register to said storage register or into said selection mechanism comprising means for clearing said accumulator register, means for connecting said accumulator register during such clearing operation to the register driving means, means including rotatable members for simultaneously connecting the register driving means to said storage register, operating members operated by translation of said rotatable members to differentially position the selection mechanism an amount determined by the angular position of said members, and means for selectively translating said members.

25. In a calculating machine having an ordinally arranged value selection mechanism, ordinally arranged rotatable accumulator wheels, zeroizing means for said accumulator wheels, ordinally arranged actuating means for differentially rotating said accumulator wheels in accordance with a digital value determined by the ordinally related selection mechanism, ordinally arranged storage wheels, means for selectively connecting said storage wheels to the ordinally related actuating means, a drive means for said actuating means, a first key, a mechanism controlled by said first key for operating said connecting means to connect said storage wheels to said actuating means and thereafter to operate said drive means whereby a value set in the selection mechanism is transmitted to said accumulator wheels and to said storage wheels simultaneously, a second key, means operated by said second key for operating said connecting means to connect said storage wheels to said actuating means, and thereafter operating said zeroizing means to zeroize said accumulator wheels whereby the value theretofore standing in the accumulator wheels is transferred into the storage wheels, separate means operable to position the selection mechanism in accordance with setting of the storage mechanism, and a third key for operating said last-mentioned means.

26. A calculating machine comprising an ordinally arranged keyboard, an accumulator, a value storage mechanism, manually operated means for inserting values into said value storage mechanism, selectively controlled power-operated means for inserting values in said storage mechanism from said keyboard or said accumulator, and separately operable means for setting said keyboard in accordance with the setting of said value storage mechanism.

27. A calculating machine comprising an ordinally arranged accumulator register, an ordinally arranged value selection means, a back-transfer mechanism associated with each order of the selection means and operable to set the selection means in accordance with the values standing in the related orders of the register, a manually controlled means for initiating operation of the back-transfer mechanism, means for locking a value in the selection means, means for releasing said latching means to zeroize said selection means, a key, and means operated by said key for first operating said releasing means and then operating said means for initiating operation of the back-transfer mechanism.

References Cited in the file of this patent

UNITED STATES PATENTS

| | | |
|---|---|---|
| 952,257 | Jahnz | Mar. 15, 1910 |
| 1,189,288 | Rechnitzer | July 4, 1916 |
| 1,941,309 | Koch | Dec. 26, 1933 |
| 2,325,388 | Friden | July 27, 1943 |
| 2,361,002 | Anderson | Oct. 24, 1944 |
| 2,550,133 | Allan | Apr. 24, 1951 |
| 2,570,456 | Karr | Oct. 9, 1951 |

FOREIGN PATENTS

| | | |
|---|---|---|
| 218,923 | Switzerland | Sept. 16, 1947 |